US010296255B1

(12) United States Patent
Tummala

(10) Patent No.: US 10,296,255 B1
(45) Date of Patent: May 21, 2019

(54) DATA MIGRATION TECHNIQUES

(71) Applicant: EMC IP Holding Company LLC, Hopkinton, MA (US)

(72) Inventor: Himabindu Tummala, South Grafton, MA (US)

(73) Assignee: EMC IP Holding Company LLC, Hopkinto, MA (US)

( * ) Notice: Subject to any disclaimer, the term of this patent is extended or adjusted under 35 U.S.C. 154(b) by 220 days.

(21) Appl. No.: 14/971,220

(22) Filed: Dec. 16, 2015

(51) Int. Cl.
*G06F 3/06* (2006.01)
*G06F 9/54* (2006.01)

(52) U.S. Cl.
CPC ............ *G06F 3/0647* (2013.01); *G06F 3/067* (2013.01); *G06F 3/0613* (2013.01); *G06F 9/546* (2013.01)

(58) Field of Classification Search
CPC ...... G06F 3/0647; G06F 3/0613; G06F 3/067; G06F 9/546
USPC .................. 710/74, 200, 3, 20, 52; 709/213; 711/114, 137
See application file for complete search history.

(56) References Cited

U.S. PATENT DOCUMENTS

| | | | | |
|---|---|---|---|---|
| 5,991,589 A * | 11/1999 | Thompson | ........... | G03G 15/161 399/297 |
| 9,176,902 B1 | 11/2015 | Long et al. | | |
| 2003/0002503 A1* | 1/2003 | Brewer | ................... | H04L 47/10 370/392 |
| 2005/0083862 A1* | 4/2005 | Kongalath | .............. | H04W 8/30 370/299 |
| 2007/0288526 A1* | 12/2007 | Mankad | ............. | G06F 11/1662 |
| 2008/0147942 A1* | 6/2008 | Brown | ..................... | G06F 3/061 710/200 |
| 2010/0217932 A1* | 8/2010 | Yamada | .................. | G06F 3/061 711/114 |
| 2013/0024626 A1* | 1/2013 | Benhase | ............. | G06F 12/0862 711/137 |
| 2014/0082180 A1* | 3/2014 | Mutoh | .................... | H04L 47/40 709/224 |

(Continued)

OTHER PUBLICATIONS

U.S. Appl. No. 14/868,596, filed Sep. 29, 2015, Long, et al.
U.S. Appl. No. 13/535,003, filed Jun. 27, 2012, Long, et al.

*Primary Examiner* — Farley Abad
*Assistant Examiner* — Henry W Yu
(74) *Attorney, Agent, or Firm* — Muirhead and Saturnelli LLC

(57) ABSTRACT

Described are techniques for performing migration from a source node to a target node. Application data used by an application is migrated from the source node to the target node. I/O operations from the application directed to the application data are sent to the target node. While migrating the application data, first processing is performed on the target node in connection with I/O operations directed to the application data. The first processing includes monitoring read operations directed to the application data. Migrating the application data includes copying a data portion of the application data from the source node to the target node. The data portion has a logical location in the application data determined in accordance with the read operations. The data portion is prefetched by the migrating and copied to the target node prior to the target node receiving a read requesting data of the data portion.

20 Claims, 14 Drawing Sheets

(56) References Cited

U.S. PATENT DOCUMENTS

2015/0301757 A1* 10/2015 Iwata .................... G06F 3/0619
711/114
2016/0197986 A1* 7/2016 Chambliss .......... G06F 9/45558
709/213

* cited by examiner

DATA MIGRATION TECHNIQUES

BACKGROUND

Technical Field

This application generally relates to data storage and, more particularly, to data migration.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of performing migration from a source node to a target node comprising: migrating, from the source node to the target node, application data used by an application, wherein I/O operations from the application directed to the application data are sent to the target node; and while performing said migrating of the application data, performing first processing on the target node in connection with I/O operations directed to the application data, said first processing comprising: monitoring one or more read operations that are directed to the application data and received at the target node, wherein said migrating includes copying a first data portion of the application data from the source node to the target node, wherein the first data portion has a first logical location in the application data determined in accordance with the one or more read operations and the first data portion is prefetched and copied to the target node prior to the target node receiving a read requesting data of the first data portion. The application may have been migrated from the source node to the target node and, while performing said migrating of the application data, the application may be executing on the target node and an instance of the application may no longer be executing on the source node. The application data may not be exposed to the application through the source node. At a first point in time prior to said migrating copying the first data portion, said migrating may be copying a second data portion from a second logical location in the application data, and wherein the first logical location and the second logical location may not be sequential consecutive logical locations in the application data. At the first point in time, said migrating may be copying the second data portion of the application data based on increasing linear sequential ordering of the logical address space of the application data, and subsequent to the first point in time, said migrating may copy the first data portion having the first logical location. A migration engine on the target node may control said migrating by pulling the application data from the source node to the target node, and wherein the migration engine may track which portions of the application data have been migrated from the source node to the target node. The migration engine may perform I/O routing for I/Os directed to the application data comprising: receiving a first read that is from the application and is directed to the application data; determining whether first read data requested by the first read has been migrated to the target node; and if it is determined that the first read data has not yet been migrated to the target node, redirecting the first read to the source node for servicing. Servicing the first read may include sending the first read from the target node to the source node; retrieving, at the source node, the first read data requested by the first read; sending the first read data from the source node to the target node; and returning, by the target node, the first read data to the application. The method may include storing, on the target node, the first read data on non-volatile storage including the application data that has been migrated from the source node to the target node; and tracking, by the migration engine, that first read data having an associated logical location in the application data has been migrated from the source node to the target node. The method may include determining whether the first read data has a size that is a multiple of a write size granularity denoting a size unit in which data is written to physical storage; responsive to determining the first read data does have a size that is a multiple of the write size granularity, performing other processing including: storing, on the target node, the first read data on non-volatile storage including the application data that has been migrated from the source node to the target node; and tracking, by the migration engine, that first read data having an associated logical location in the application data has been migrated from the source node to the target node. The method may include, responsive to determining the first read data does not have a size that is a multiple of the write size granularity, performing second processing comprising: tracking an associated logical location of the first read data as a location including data that has not been migrated from the source node to the target node, wherein the associated logical location is tracked as having been a target of a read operation that is included in the one or more read operations of said monitoring for use in connection with determining a next data portion to prefetch from the source node, and wherein the first read data is not stored on non-volatile storage including the application data that has been migrated from the source node to the target node. The migration engine may perform said migrating as a background copying operation. The migration engine may perform said monitoring of the one or more read operations, and the migration engine may use a prefetch heuristic to determine the first logical location in accordance with the one or more read operations. The one or more read operations may include two read operations received at the target node where a first of the two read operations may be directed to a first logical address of the application data and a second of the two read operations being directed to a second logical address of the application data. The prefetch heuristic may determine the first data portion that is a logically contiguous segment of the application data to be copied by said migrating, and the logically contiguous segment may span a logical address subrange of the application data from the first logical address to the second logical address. The application data may be a logical entity that is any of a logical storage device, a file, and an object. The first processing may include receiving a write operation directed to the application data, the write operation writing data to a target location of the application data; determining whether the write operation writes data having a size that is a multiple of a write size granularity; and responsive to determining the write operation writes data having a size that is a multiple of the write size granularity, performing the write operation on a copy of the application data of the target node and performing the write operation on another copy of the application data of the source node. The first processing may include, responsive to determining the write operation does not write data having a size that is a multiple of the write size granularity, performing second processing comprising: tracking the target location as a location including data that has not been migrated from the source node to the target node; and redirecting the write operation to the source node for servicing by the source node, wherein the source node performs merge processing that generates a final data portion having a size that is a multiple of the write size granularity, said merge processing merging first write data of the write operation at the target location with other existing data to form the final data portion stored on the source node, wherein said migrating copies the first write data of the target location from the source node to the target node at a point in time subsequent to storing the final data portion on the source node. The source node and the target node may both be data storage systems.

In accordance with another aspect of the invention is a computer readable medium comprising code stored thereon that, when executed, performs a method of migration from a source node to a target node comprising: migrating, from the source node to the target node, application data used by an application, wherein I/O operations from the application directed to the application data are sent to the target node; and while performing said migrating of the application data, performing first processing on the target node in connection with I/O operations directed to the application data, said first processing comprising: monitoring one or more read operations that are directed to the application data and received at the target node, wherein said migrating includes copying a first data portion of the application data from the source node to the target node, wherein the first data portion has a first logical location in the application data determined in accordance with the one or more read operations and the first data portion is prefetched and copied to the target node prior to the target node receiving a read requesting data of the first data portion.

In accordance with another aspect of the invention is a system comprising: a source data storage system including application data that is stored on a non-volatile storage device and that is used by an application; and a target data storage system comprising an instance of the application stored in a second memory, said second memory further comprising code stored therein that, when executed, performs a method of migration from the source data storage system to the target data storage system comprising: migrating, from the source data storage system to the target data storage system, the application data, wherein I/O operations from the instance of the application executing on the target node are directed to the application data stored on the target node; and while performing said migrating of the application data, performing first processing on the target data storage system in connection with I/O operations that are directed to the application data and are received from the application executing on the target data storage system, said first processing comprising: monitoring one or more read operations that are received from the application executing on the target data storage system and are directed to the application data, wherein said migrating includes copying a first data portion of the application data from the source data storage system, the first data portion has a first logical location in the application data determined in accordance with the one or more read operations and the first data portion is prefetched and copied to the target data storage system prior to the target data storage system receiving a read requesting data of the first data portion, and wherein the application has been migrated from the source data storage system to the target data storage system and, while performing said migrating of the application data, the instance of the application is executing on the target data storage system and no instance of the application is executing on the source data storage system.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
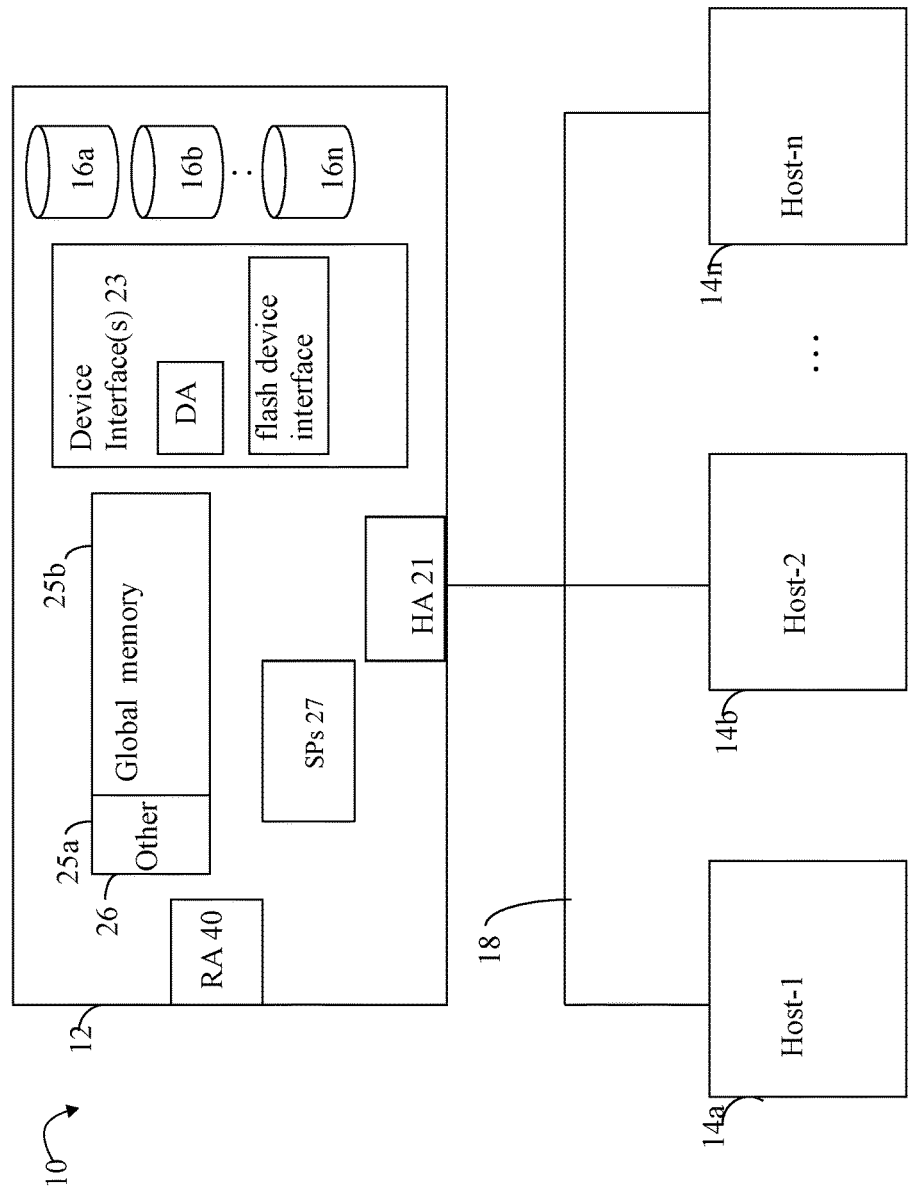
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices. More generally, the techniques herein may also be used with any type of SSD although following paragraphs may make reference to a particular type such as a flash device or flash memory device.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM) 25b. In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing.

Figure 2:
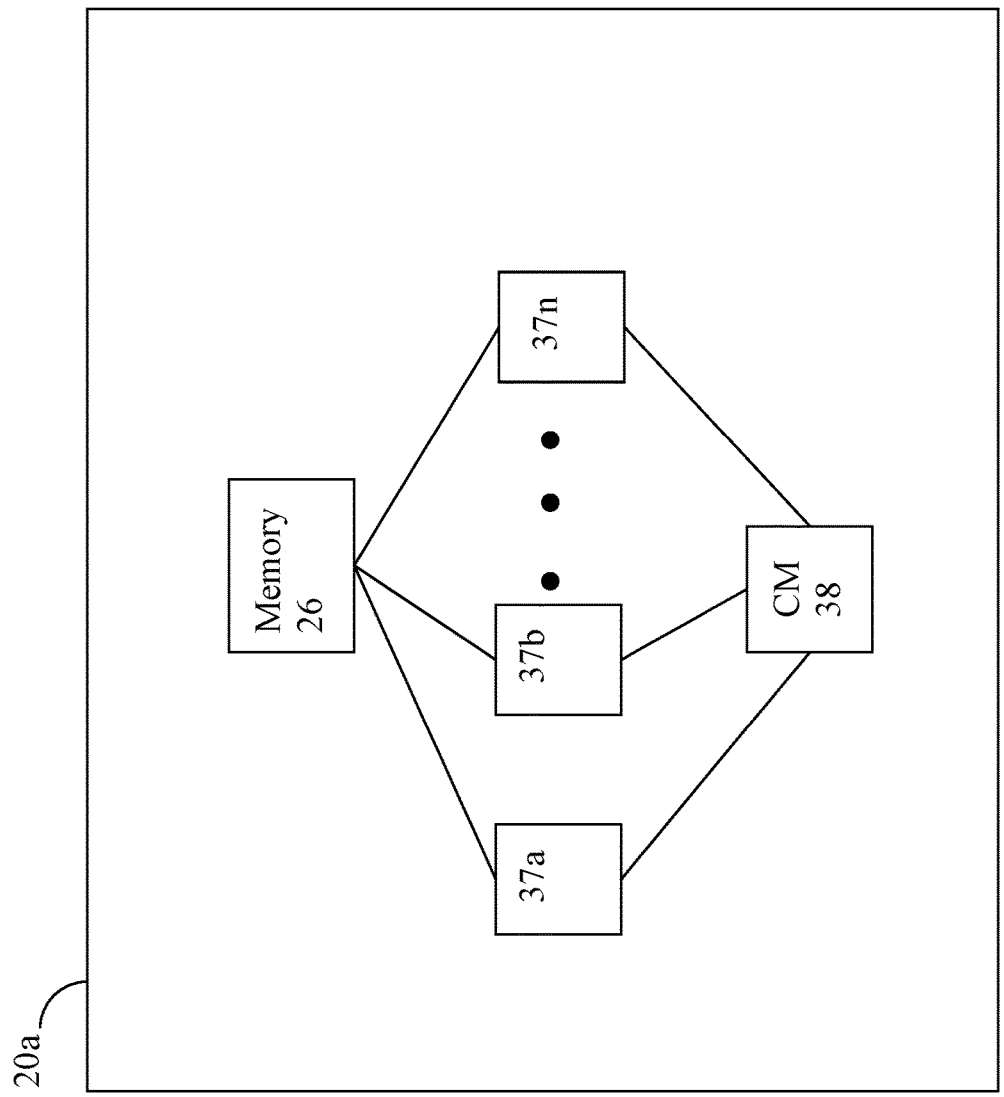
FIG. 2 is a representation of the logical internal communications between the directors and memory in an embodiment of a data storage system in accordance with techniques herein.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. In connection with performing I/O operations, such as writes as well as reads, a data storage system in an embodiment in accordance with techniques herein may use a cache in order to improve performance. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as the VNXe™ data storage system by EMC Corporation of Hopkinton, Mass., that includes multiple storage processors (SPs) 27. Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

In at least one embodiment of a data storage array using techniques herein, the data storage devices 16a-16n may include a combination of disk devices and flash devices in which the flash devices may appear as standard Fibre Channel (FC) drives to the various software tools used in connection with the data storage array.

In connection with performing I/O operations, such as writes as well as reads, a data storage system in an embodiment in accordance with techniques herein may use a cache in order to improve performance.

Figure 3:
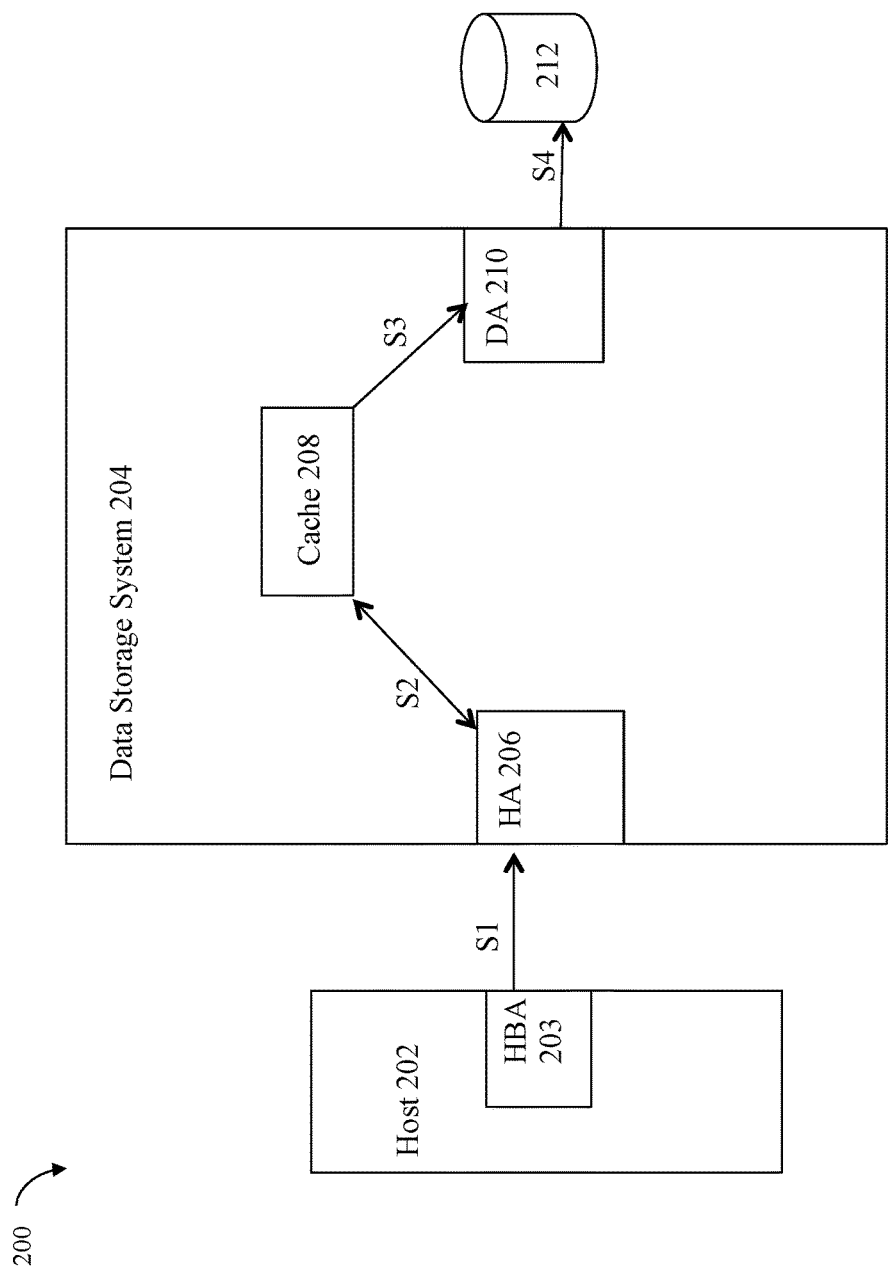
FIGS. 3 and 4 are examples illustrating components and data flow in connection with performing I/O operations in an embodiment in accordance with techniques herein.

Referring to FIG. 3, shown is an example illustrating processing of a write I/O operation received at the data storage system in an embodiment in accordance with techniques herein, whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive or other form of non-volatile storage. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data at the cache slot location is written to physical storage in step S4.

In at least one embodiment in accordance with techniques herein, the data storage system may return an acknowledgement that the write operation has completed once the write data has been written to cache even though the write data may not yet have been destaged from cache and written to physical storage, such as the physical drive 212.

Figure 4:
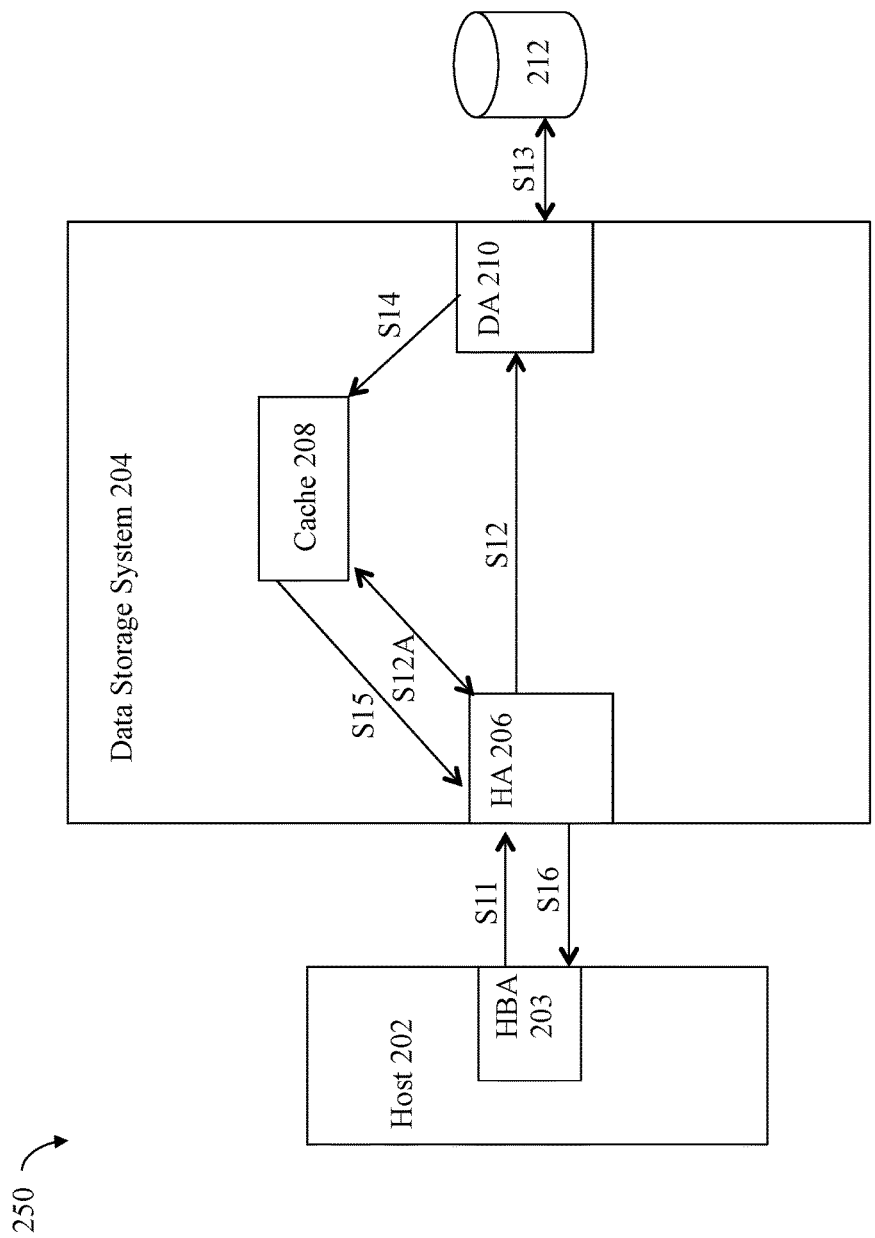

Referring to FIG. 4 shown is an example illustrating processing of a read I/O operation received at the data storage system, in an embodiment in accordance with techniques herein, whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S15 from the cache 208 and then return the requested read data (as retrieved from cache) to the host 202 in step S16.

It should be noted that a single host I/O operation may result in one or more back end PD I/Os depending on the physical data storage configuration. For example, the host I/O operation may request to write data to LUN A, LBA 100. Physical storage for LUN A may be provisioned from a RAID group whereby to perform the single host I/O write operation may require multiple reads and/or writes depending on the particular RAID configuration. For example, LUN A may have storage provisioned from a RAID-1 group including two PDs. RAID-1 provides for data mirroring so that the single host I/O operation results in two backend PD writes to the two PDs of the RAID-1 group in order to mirror the write data.

Additionally, a single host I/O operation may result in no back end PD I/Os. For example, the host I/O operation may be read resulting in a read hit. Thus, having requested read data in cache prior to receiving a read requesting such cached data, such that a read hit results, is one I/O operation performance benefit of caching.

As described in more detail in following paragraphs, the size of a single unit of cache data may be referred to herein as a page. The size of a page may vary with embodiment.

Figure 5:
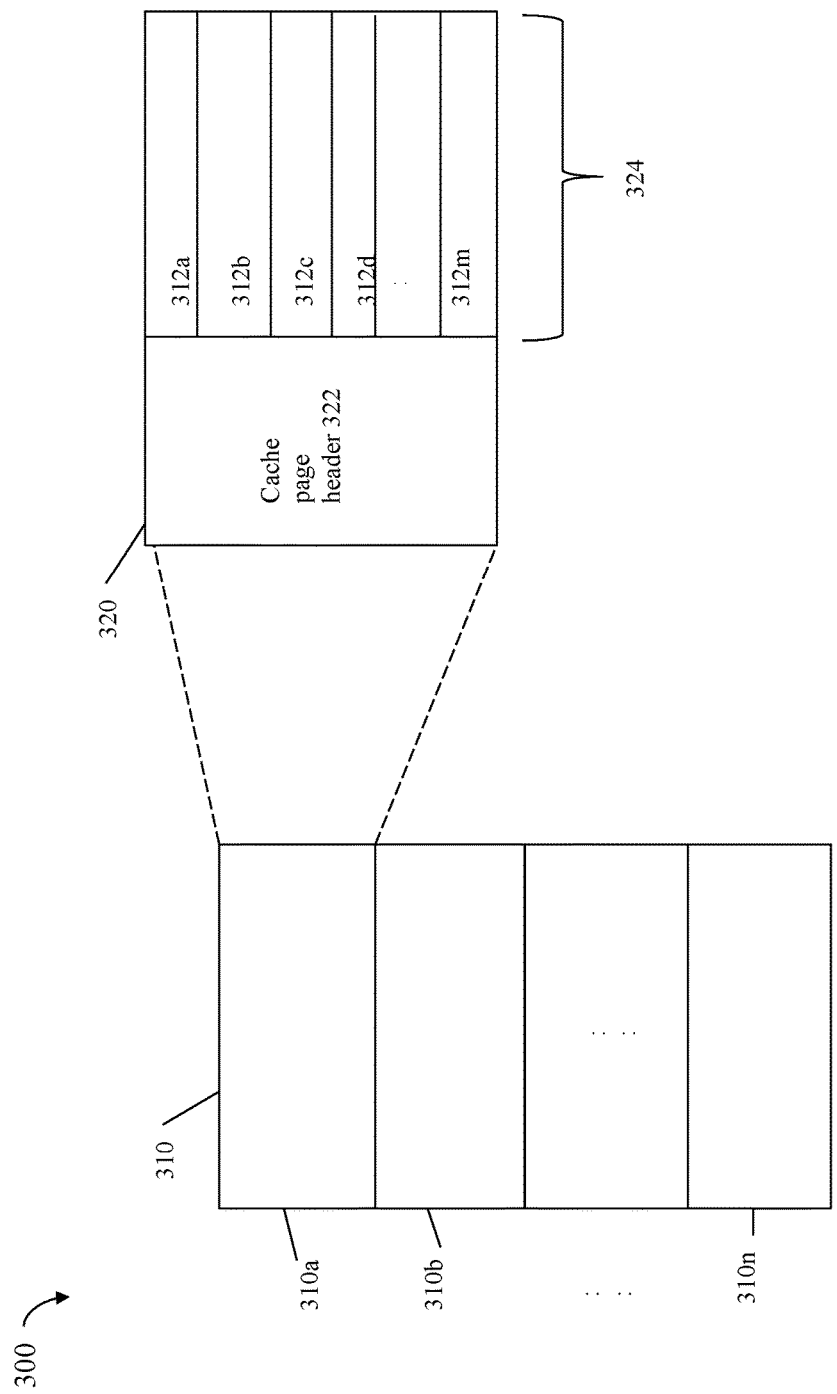
FIG. 5 is a logical representation of a cache that may be used in an embodiment in accordance with techniques herein.

Referring to FIG. 5, shown is an example illustrating a logical representation of a data cache that may be used in an embodiment in accordance with techniques herein. The data cache of FIG. 5 may represent the data cache used by in a data storage system in accordance with techniques herein.

In the example 300, element 310 may represent the memory or storage used as the data cache which is partitioned into cache pages 310a-310n. It should be noted that the example 300 is a logical representation of a cache that may be implemented using any suitable data structure(s) known in the art. Each of the cache pages 310a-n may contain varying amounts of WP data, cached read data, and the like. Element 320 provides additional detail of single cache page 320. Cache page 320 may include a cache page header 322 and cache page data 324. The cache page data 324 illustrates that a single cache page of data may further include multiple portions of data 312a-m each of which may or may not include WP data, read cached data, and the like, and each of which may or may not include any cached data. The cache page header 322 may include additional information, such as metadata, regarding the cached data stored in 324. For example, the header 322 may denote whether the data cached in each of the portions 312a-m is WP data. In some embodiments, the cache page header 322 of each cache page 320 may be an object which is located in a separate memory area from the cached data 324 of the cache pages 310a-m. In some embodiments, each cache page header 322 may include a pointer or other reference to the particular one of the cached data areas 312a-m associated with the cache header 322. The cached data and associated cache metadata (as may be included in the cache page headers and/or elsewhere) may each be stored separately from one another and in any suitable location.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 810 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 310a (illustrated in more detail by 320), it may be that one or more portions 312a-m of the page 320 include WP data as well as non-WP data. For example, the cache page 320 may include non-WP data in 312a and 313c (e.g., 312a and 312c may include data read from a physical device and stored in the cache page in connection with servicing a read miss operation). Additionally, one or more portions 312a-m of the same cache page 320 including WP data may be empty and contain no data. For example, all of page 320 may include WP data except for 312a-b which may contain no cached data.

It should be noted that each portion 312a-m of a cache page may correspond, for example, to a track, a number of blocks, or other storage size unit. For each of the "m" portions of a cache page, some or all data of a single portion may be stored in cache since the size unit for reading and writing data may be less than a single data portion.

In one embodiment in accordance with techniques herein, a cluster or group of data storage systems (e.g., such as in a federation, SAN, and the like), may include 2 or more data storage systems, such as a first data storage system and a second data storage system. Each data storage system (DS) may provide a virtualized environment where the SP, its associated DAs and FAs and the microcode, operating systems and other software/code executing on the SP, are virtualized. For example, in one embodiment, the SP, its associated DAs, FAs and software/code executing on any of the foregoing components may execute as a single virtual machine (VM) on a data storage system to service I/Os. Additionally, an application, such as may traditionally run on a host, may execute in the context of another VM on the same data storage system. The application may be, for example, a database application, an email application, and the like, having their application data stored on the data storage system. The data storage system may also be a high availability data storage system such as described herein including two SPs with appropriate duplicate or replicate hardware and software for purposes of high availability. Thus, each data storage system in the cluster may include two VMs for two virtualized SPs and associated software and other virtualized data storage system hardware components (e.g., FA, DA) for servicing I/Os. In this manner, each SP of the data storage system may be virtualized and I/Os may be serviced using virtualized DS components (e.g., DA, FA) to store and retrieve data from PDs. The embodiment of the data storage system may also include PDs of various types/tiers having different performance capabilities.

In such an embodiment in which a cluster of data storage systems each include a virtualized environment where each SP and associated hardware and software as well as applications executing thereon are virtualized, load balancing may be performed. The load balancing may be performed by software, for example, on one or more of the data storage systems or an external component to balance the workload of the data storage systems of the cluster. For example, load balancing may be performed to shift workload from a first data storage system to a second data storage system of the cluster if the first data storage system has a much larger workload than the second data storage system. The first data storage system may include multiple applications executing thereon which store their data on the first data storage system. The second data storage system may only include a single application. The load balancing software may, for example, determine that the workload of the first data storage system is overloaded or overutilized (e.g., the processor and other component utilization (DA, FA) exceeds an acceptable utilization level) and much higher than the workload of the second data storage system. In response, an action may be taken to more evenly distribute the workload between the two data storage systems and alleviate the overloaded or overutilized state of the first data storage system such as by migrating an application and its data from the first data storage system to the second data storage system. In connection with the migration of the application and its data, the first data storage system may also be characterized as a source data storage system or source node and the second data storage system may be characterized as the target data storage system or target node.

Figure 6:
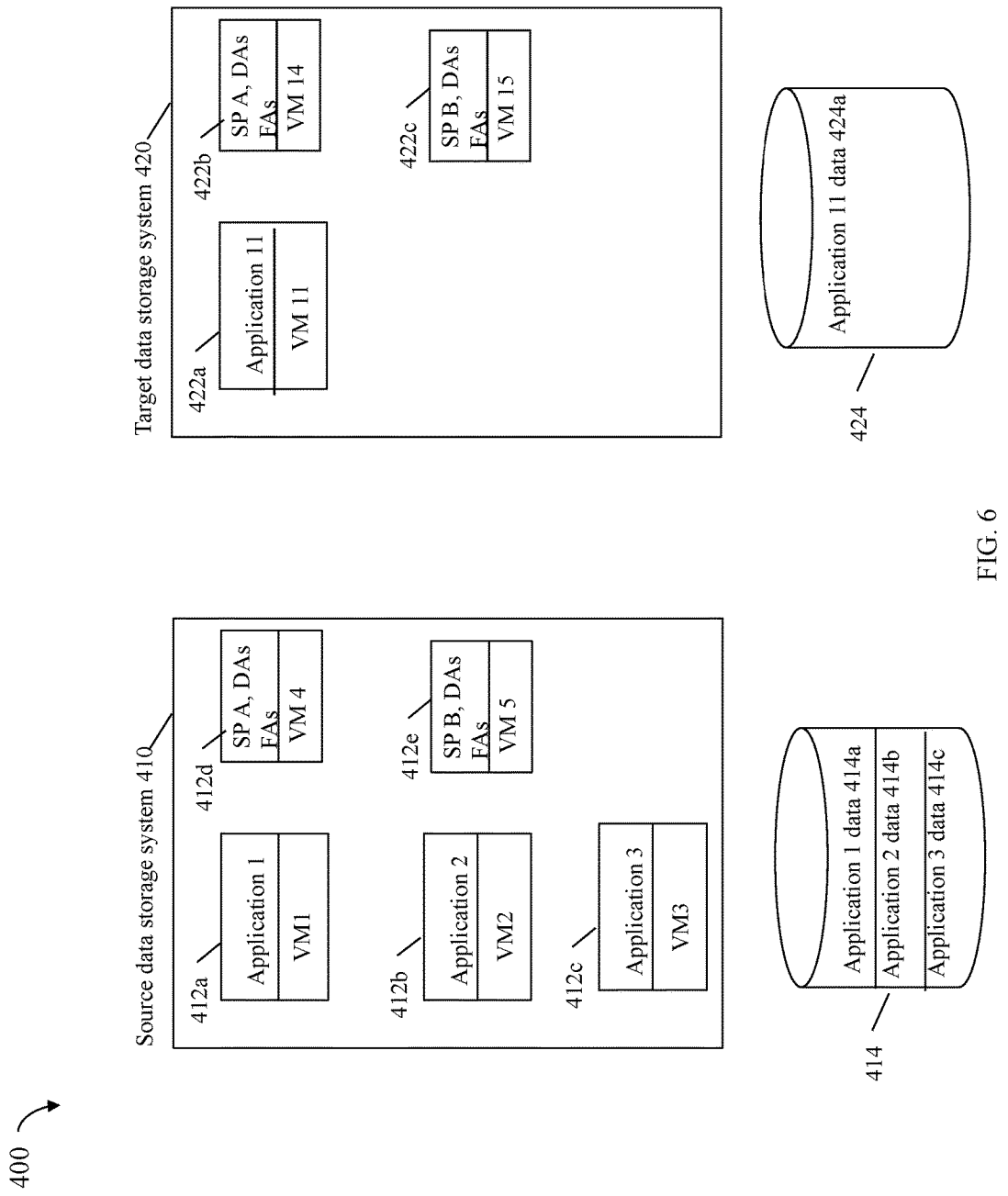
FIGS. 6, 7 and 8 are examples of components of data storage systems in an embodiment in accordance with techniques herein.

Referring to FIG. 6, shown is an example of source and target data storage systems of a cluster in an embodiment in accordance with techniques herein. The example 400 includes source data storage system 410 and target data storage system 420 where each may include a virtualized environment for applications executing thereon and also for SPs and related components for servicing I/O operations in a manner as described above. Such I/O operations may be from the applications executing on such data storage systems where the applications have their respective application data stored on PDs (or more generally non-volatile storage devices) of the data storage systems.

In the example 400, the source data storage system 410 may include 5 VMs 412a-e thereon. Three applications (e.g., application1, application 2, and application 3) may be executing on the source data storage system 410 each in the context of their own VM. The VMs 412a, 412b and 412c may be the 3 virtualized applications executing on the source data storage system 410. VMs 412d and 412e may be virtualized SPs and their associated virtualized DAs and FAs and associated software or code (e.g., operating system, microcode, and the like) which service I/Os such as the I/Os from the virtualized applications of 412a-c directed to different sets of application data 414a-c. The source data storage system 410 may include one or more PDs 414 providing non-volatile data storage for the application data sets 414a-c. Application data 414a may be used by application 1 of 412a. Application data 414b may be used by application 2 of 412b. Application data 414c may be used by application 3 of 412c.

In the example 400, the target data storage system 420 may include 3 VMs 422a-c thereon. One application (application 11) may be executing on the target data storage system 420 each in the context of its own VM. The VM 422a may be the virtualized application 11 executing on the target data storage system 410. VMs 422b and 422c may be virtualized SPs and their associated virtualized DAs and FAs and associated software or code (e.g., operating system, microcode, and the like) which service I/Os such as the I/Os from the virtualized application of 422a directed to application data 424a for application 11. The target data storage system 420 may include one or more PDs 424 providing non-volatile data storage for the application data set 424. Application data 424a may be used by application 11 of 422a.

The data storage systems 410 and 420 may include other components such as described above and elsewhere herein which have been omitted for simplicity of illustration.

Consistent with description elsewhere herein, the load balancing may determine that the source data storage system 410 is overloaded as compared to the target data storage system 420. In response, processing may be performed to more evenly distribute the workload between 410 and 420 by migrating an application and its data from the source data storage system 410 to the target data storage system 420. For purposes of illustration in this example, application 1 (executing in the context of VM 1 412a) and its application data 414a is to be migrated from the source data storage system 410 to the target data storage system 420.

In a system not performing techniques herein, the application 1 currently running on the source data storage system may be duplicated or copied to the target data storage system. Additionally, the application data 414a may be copied to the target data storage system. While the foregoing application 1 and its application data 414a are being copied to the target data storage system, the application 1 continues to execute on the source data system using the application data 414a on the source data storage system. Once the application 1 and its data 414a have been copied to the target data storage system, the migration of the application and its data is complete and a switchover may then occur where the application and its data on the source data storage system are no longer used and the application and its data on the target data storage system are used. Thus, in a system not performing techniques herein, the switchover to the target data storage system does not occur until both the application and its data have completed migration to the target data storage system.

Figure 7:
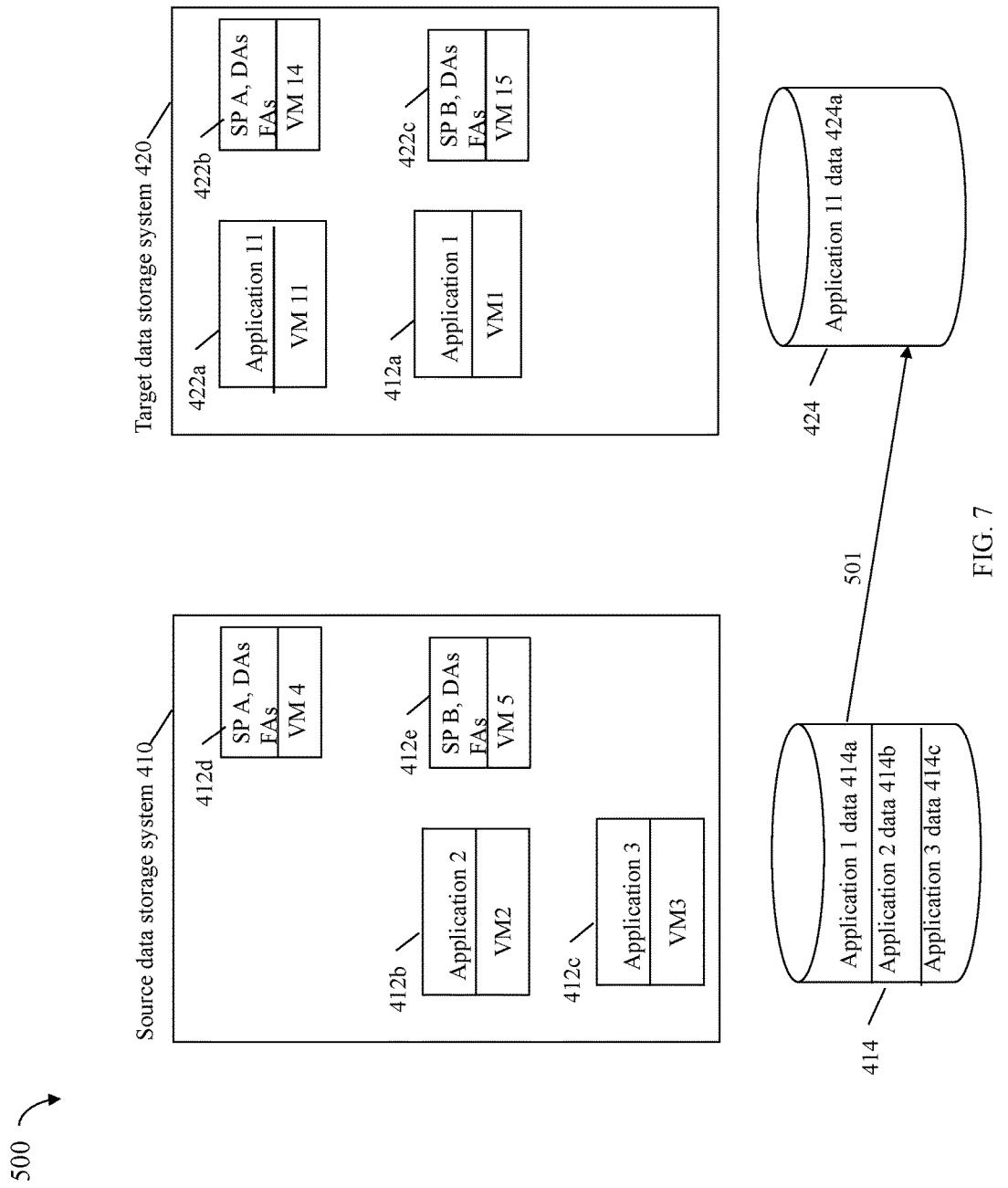

In contrast to a system not in accordance with techniques herein, an embodiment in accordance with techniques herein may perform migration of the application and its data in a different manner. In an embodiment in accordance with techniques herein, the application 1 currently running on the source data storage system may be duplicated or copied to the target data storage system. Additionally, the application data 414 may be copied, such as part of a background migration or copying operation, to the target data storage system. While the application data 414a is in the process of being copied or migrated to the target data storage system, the application 1 on the target data system may execute rather than have the application 1 execute on the source data storage system so that the switchover of the application (from the source to the target data storage system where the application 1 executes on the target data storage system) occurs while the application data 414a is in the process of being copied or migrated from the source to the target data storage system. In an embodiment in accordance with techniques herein, such as illustrated in FIG. 7, application 1 may be migrated to and execute on the target data storage system in the context of a VM as denoted by 412a. At the same time, the migration of the application data 414a used by application 1 from PD 414 of the source data storage system to PD 424 of the target data storage system may be in progress 501 and not yet completed while the application 1 of 412a (now executing on the target system 420) is currently issuing I/Os to the application data 414a. Additional components used in connection with processing such I/Os and used in an embodiment in accordance with techniques herein are described in more detail in following paragraphs.

In connection with FIG. 7, it should be noted that the application 1 412a executing in the context of VM1 is illustrated as having been migrated from the source data storage system 410 to the target data storage system 420 whereby there is no instance of the application 1 currently executing on the source data storage system 410. In an embodiment in accordance with techniques herein, an instance of the application 1 in the context of a VM may execute on the source data storage system 410 until the migration of 412a to the target data storage system has completed. As a variation from FIG. 7, it may be also that once the migration of application1 to the target system 420 has completed, another instance of the application 1 is also still on the source data storage system 410 although it may be that only the instance 412a of the application 1 on the target data storage system is currently issuing I/Os.

Traditionally, in existing systems not using techniques herein, read caching and/or tracking incoming I/Os with respect to the application 1 data 414a on the target data storage system do not start until all the application data 414a has been migrated or copied to the target data storage system 420. Additionally, in such existing systems not using techniques herein, information regarding frequently accessed portions of the data 414a, which portions of 414a are cached, and the like, as it exists on the source data storage system 410 is typically not available or used in the target data storage system 420. Thus, when the application 1 executing on the target data storage system 420 begins issuing I/Os to its application 1 data, there may be a drop in I/O performance for application 1 (now executing on 420) until a sufficient number of application 1 I/Os are issued to thereby populate the cache of the target data storage system 420 with portions of application 1 data 414*a*.

In connection with an embodiment in accordance with techniques herein, processing may be performed to track or monitor the incoming received I/Os on the target data storage system where such I/Os are directed to the application data 414*a* currently being migrated (e.g., migration of data 414*a* is in progress and has not yet completed). In this manner, as described in more detail elsewhere herein, an embodiment in accordance with techniques herein may use such monitored I/O patterns in connection with determining what data portions the background copy or migration process should copy next from the source to the target data storage system.

It should be noted that following paragraphs may make reference to a particular embodiment in which techniques herein may be utilized. However, it will be appreciated by those of ordinary skill in the art that such techniques have broader applicability and are not limited by details or particulars of the embodiment such as may be presented for illustration. For example, techniques herein may be used in an embodiment of source and target data storage systems which do not have virtualized environments with VMs for virtualized applications and data storage system components. To further illustrate, techniques herein may be used in data storage systems where applications executing on the data storage systems do not execute in the context of VMs on the data storage systems and where the SPs and associated components (e.g., DAs, FAs, and software such as operating system and microcode) which service I/O operations are also not virtualized. As a further variation, one or more of the applications may also execute on a host or another computer system, processor or component external to the data storage systems 410 and 420. In such a case, the application itself may remain executing on the same host or other component with the migration using techniques herein performed to migrate the application's data from the source to the target data storage system.

Figure 8:
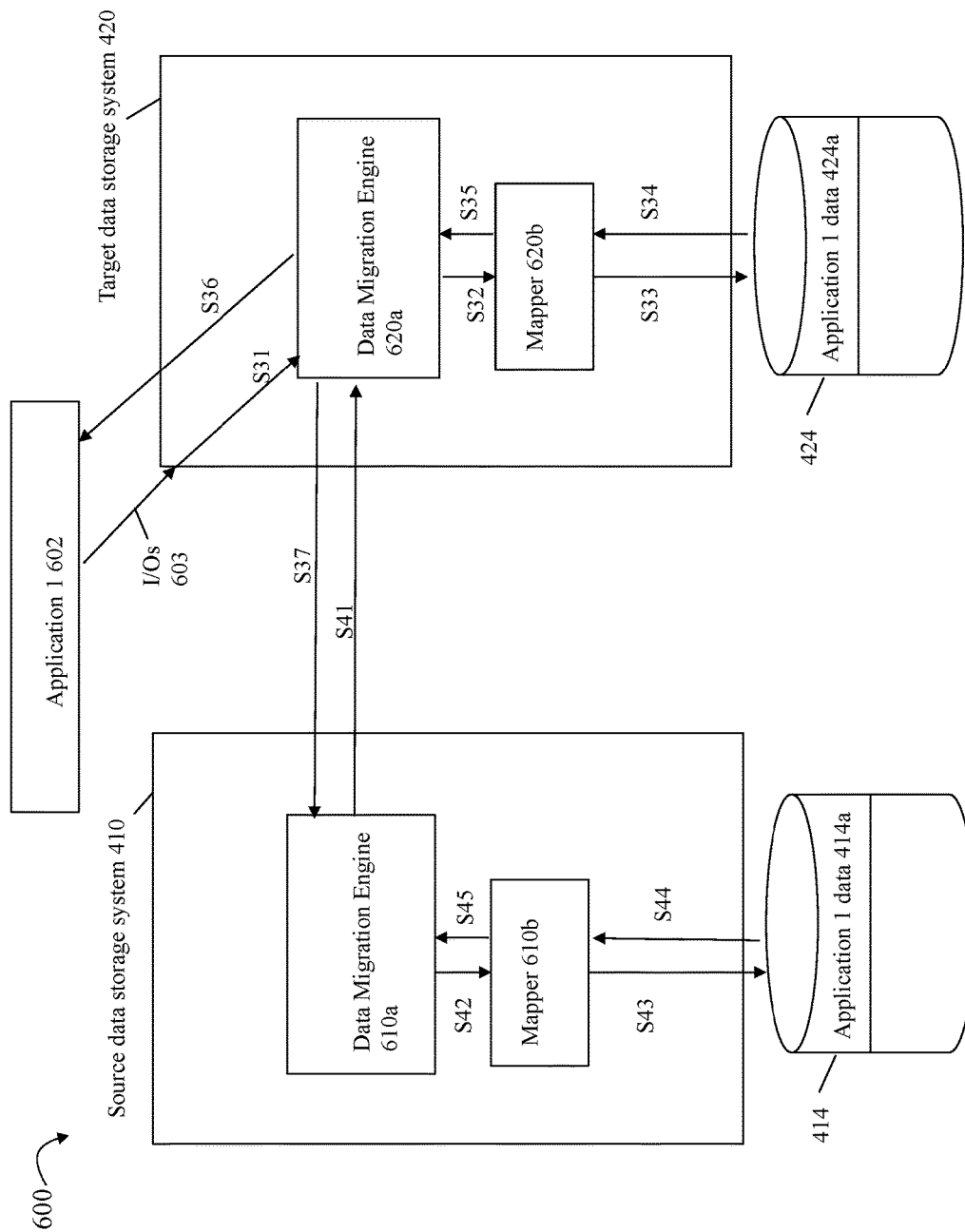

Referring to FIG. 8, shown is an example illustrating in more detail components of the source and target data storage systems in an embodiment in accordance with techniques herein. The example 600 includes the source data storage system 410 and the target data storage system 420 as described above and additionally illustrating in more detail components and associated data flow as may be performed in an embodiment in accordance with techniques herein. In the example 600, the application 1 602 is illustrated as not executing on the target data storage system 420. However, consistent with discussion above, the application 1 602 may be executing on another system, such as a host, that is external from the data storage systems 410 and 420, or may otherwise execute on the target data storage system 420 (e.g., application 602 may be executing in the context of a VM in a virtualized environment of the target data storage system 420). The application 1 602 is the application having data stored on the source data storage system 410 that is being migrated to the target data storage system 420. The state of the systems in the example 600 is that the copy of the application data 414*a* of the source data storage system 410 is not exposed or accessible to the application 1 602 directly through the source data storage system 410. In other words, the application 602 is not able to issue I/Os to the copy of the application data 414*a* by sending such I/Os directly to the source data storage system 410. Rather, the copy of the application data 424*a* is exposed or accessible to the application 602 directly through the target data storage system 420. As illustrated by 603, the application 602 may issue I/Os directed to the application 1 data 424*a* where such I/Os are received at the target data storage system 420.

It should be noted that elements 414*a* and 424*a* may each represent the same defined logical entity (e.g., the same logical entity from the application 602's perspective) where logical entity 414*a* has physical storage provisioned from one or more PDs 414 and logical entity 424 has physical storage provisioned from one or more PDs 424. For example, 414*a* may denote a LUN and 424*a* may also denote a LUN presented to the application 602 as having same identity as the LUN 414*a*. In the example 600, the application data 414*a* is not exposed directly to, or accessed directly by, the application 602. However, the application data 424*a* is exposed directly to, or accessed directly by, the application 602 so that the application 602 may issue I/O operations directed to the logical entity denoted by 424*a*. Generally, the logical entity represented by 414*a* and 424*a* may a LUN, file, object, or any other logical entity to which the application 602 may issue I/Os. The logical entity, such as the LUN denoted by 414*a* and 424*a*, may have an associated logical address space where an I/O operation directed to the LUN may identify the particular logical address or location in the logical address space to which the I/O is directed.

The source data storage system 410 includes a data migration engine 610*a*, mapper 610*b* and a source copy of application data 414*a* used by application 1 602. The application data 414*a* is stored on one or more PDs 414 of the source data storage system 410. The target data storage system 420 includes a data migration engine 620*a*, mapper 620*b* and a target copy of application data 424*a* used by application 1 602. The application data 424*a* is stored on one or more PDs 424 of the target data storage system 410. The example 600 illustrates an in-progress migration of the application data 414*a* to the target data storage system whereby application data 424*a* represents the result of the in-progress process of migrating application data 414*a* from the source data storage system 410 to 424*a* of the target data storage system 420.

Each of the mappers 610*b* and 620*b* may map a logical address or location of a logical entity, such as a LUN, file or object, to which an I/O may be directed, to its corresponding physical location on non-volatile storage, such as a physical location on one or more PDs.

The data migration engine 620*a* of the target data storage system 420 may be controlling the migration of application data 414*a* to the target data storage system 420. In at least one embodiment, the data migration engine 620*a* may copy or migrate the application data 414*a* by pulling the application data 414*a* from the source data storage system 410 to the target data storage system 420. The data migration engine 620*a* may track which logical addresses of application data 414*a* include data yet to be migrated and thus which logical addresses of 414*a* include data that has been migrated. Such tracking may be performed using a bitmap or other suitable structure known to those skilled in the art.

In one embodiment, the foregoing copying or pulling may be performed by a background copy process or task that issues requests S37 to the source data storage system for the application data 414*a*. In the example 600, the migration of the application data 414*a* is performed while the application 602 is executing and issuing I/O operations 603 directed to the application data 424*a* to the target data storage system 420. Thus, while the application 602 is executing and issuing I/O operations 603 to the target data storage system 420, the data migration engine 620a may be pulling data from the source data storage system to the target data storage system such as by copying data of a LUN or other logical entity 414a to 424a. The data migration engine 620a may issue requests to the data migration engine 610a to copy or migrate the various data portions of 414a to 424a. Such requests in connection with the data copying or migration may reference logical addresses in the application 1 data 414a and the requests may flow S37 from data migration engine 620a to data migration engine 610a and then S42 to mapper 610b which maps a logical address of the application data 414a to its corresponding physical location. The requested data may be requested S43 and retrieved S44 from physical storage 414 and then returned to the target data storage system 420 along a path denoted by S45, S41. The returned migrated data of 414a may then be written to physical storage 424 along the path denoted by S32 and S33. In at least one embodiment, the portions of the migrated application data of 414a to be written as a copy of the application data 424a on PDs 424 may be stored in cache of the target system 420 and later destaged to PDs 424 as described elsewhere herein in connection with write operations. Thus, the background or other copying performed to migrate application data 414a may denote a first I/O stream where the data migration engine 620a may track what data portions or logical addresses of the application data 414a have been copied at various points in time from the source to the target data storage system. As described in more detail below, the background copying performed to migrate the application data 414a to the target data storage system 420 may use one or more heuristics to determine a particular order in which the various data portions of the application data 414a are copied. By default, the background copying may be performed based on a sequential logical ordering of the logical address space of the application data 414a. For example, at the start of the migration, copying may commence starting with migrating the application data beginning with the first logical address of the application data's logical address space and then proceeding to copy subsequent data located at increasing sequential consecutive logical addresses. For example, copying may initially start migrating application data located at logical address 1 and then subsequently copy data located at sequentially increasing consecutive logical address (e.g., logical address 2, 3, 4, and the like, at which data is stored). In an embodiment in accordance with techniques herein as described in more detail elsewhere herein, monitoring may be performed of read operations included in application I/Os 603 which are received at the target data storage system and are directed to the application data 424a. The monitored read pattern of received read operations may be used by the background copying operation to determine what subsequent portions of the application data 414a to copy next as part of the migration process. As described elsewhere in more detail, one or more heuristics may use the monitored read pattern of one or more received read I/Os to determine what next data portions to copy. In one aspect, such next data portions may be characterized as prefetched where a prefetch heuristic is used to determine portions of application data 414a, which have not yet been migrated, are likely to be requested in subsequent reads based on temporal and spatial locality of reference principles (e.g., copy data as part of the migration prior to the data being requested in connection with a subsequent read operation received at the target data storage system). A determination of what data portions that have not yet been migrated and are likely to be requested next (e.g., by subsequent reads of 603) may be based on one or more logical addresses of one or more recently received reads.

The migration engine 620a includes routing logic to determine whether a read directed to the application data that is received at the target data storage system 420 may be serviced using the current copy of the application data 424a on the target data storage system 420. The foregoing determination depends on whether the requested read data has been copied or migrated to the target data storage system (e.g., whether the requested read data has already been copied from 414a to 424a. For example, the data migration engine 620a may have copied data from logical addresses 1-10 of the application data 414a to 424a and a read may be received on the target system 420 to read data at logical address 5 which has been copied to 424a of the target system 420 by the data migration engine 620a. In this case, the read operation may be serviced using the copy of the requested data for logical address 5 as stored in 424a of the target data storage system. The flow for such a read operation to obtain and return the requested read data may be from the data migration engine 620a to mapper 620b (S32) where the read data may be requested S33 and retrieved S34 from the PDs 424, returned S35 to the data migration engine 620a and then returned S36 to the requesting application 602.

As another example, a read may be received on the target system 420 to read data at logical address 50 which has not yet been copied to 424a of the target system 420 by the data migration engine 620a. The data migration engine 620a may determine that the requested read data of logical address 50 has not yet been copied and then redirects the read I/O for logical address 50 for servicing by the source system which retrieves the data for logical address 50 and returns the requested read data to the target system 420. Subsequently, the requested read data may then be returned by the target system 420 to the requesting application 602. In an embodiment in accordance with techniques herein, the data migration engine 602a may track the re-directed reads, or more generally, the reads directed to the application data 424a where such reads are received at the target data storage system 420 whereby such tracking may include tracking the logical address to which each such received read is directed. The flow for such a read operation to obtain and return the requested read data from the source data storage system 410 may be from the data migration engine 620 S37 to data migration engine 610a, to mapper 610b (S42) where the read data may be requested S43 and retrieved S44 from the PDs 414. The requested read data may be returned S45 to data migration engine 610a and then further returned S41 to the data migration engine 620a and returned S36 to the requesting application 602. Thus the I/O stream associated with obtaining requested read data from the source data storage system 410 for such redirected reads may denote another I/O stream in addition to first I/O stream mentioned above for the background copying performed as part of the data migration. In other words, the background copy processing may be performed as described herein which generates the first I/O stream that copies various portions of the application data 414a in an order that may be determined using one or more heuristics, such as a prefetch heuristic as described herein based on the monitored reads at the target system 420 directed to the application data 424a. A separate and independent I/O stream to obtain requested read data for redirected reads exists as a result of servicing received I/Os 603 directed to the application data 424a at the target system 420.

It should be noted that when requested read data needs to be obtained from the source system 410 to service the read operation because the requested read data is currently not located in 424a, the requested read data obtained from the source system 410 may also be stored or written out to 424a of PD 424 (e.g., via storing in cache and then later destaging to PD 424 as described elsewhere herein). The data migration engine 620a may also mark the logical address of the requested read data as being copied to 424a (e.g., no need to further migrate the requested read data). Additionally, the requested read data may also be stored in the cache of the target data storage system 420 and used in connection with servicing subsequent requests for the read data.

The data migration engine 420a may track the one or more redirected reads (e.g., reads redirected from the target to the source), or more generally all/any reads such as recently (e.g., within a predetermined amount or window of time, previous one or more reads) received reads directed to the application data 424a. The application data 414a may be copied by the background copying of the migration in an ordering determined using a prefetch heuristic based on such one or more received reads of 603. Such prefetching may use any suitable or known prefetch heuristic to determine one or more other data portions to prefetch based on a history of one or more received reads. By default, the data migration engine 620a may copy the application data 414a from the source to the target as described above using a default algorithm or technique such as linear copying of the application data 414a based on sequential ordering of the logical addresses of the application data 414a. Once the data migration engine 620a has received a sufficient number of one or more reads 603 to use with the prefetch heuristic, the data migration engine 620a may interrupt its default copying technique to migrate subsequent portions of the application data, where such portions may be characterized as prefetched data portions of the application data 414a migrated in an order determined in accordance with the prefetch heuristic.

Figure 9:
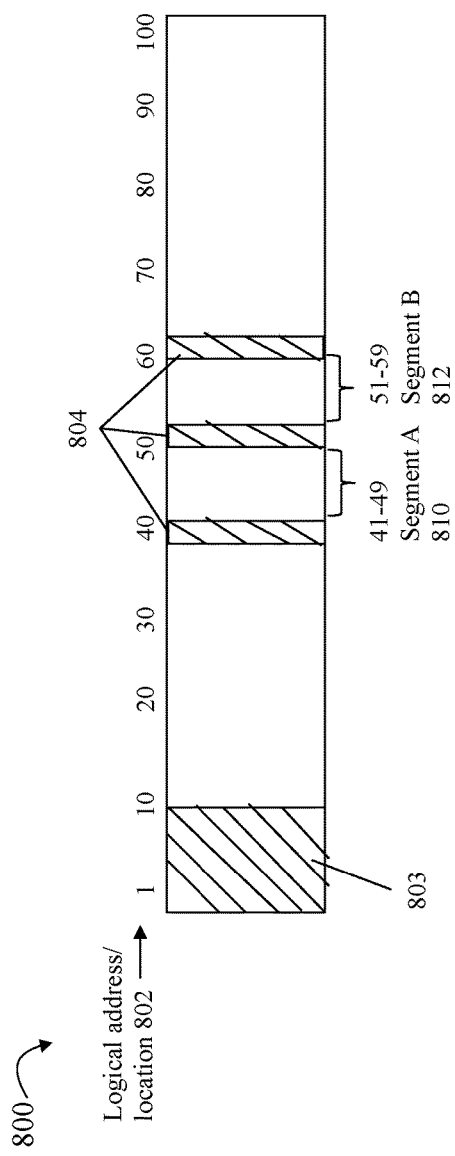
FIG. 9 is an example illustrating a logical address space and data segments thereof selected by a prefetch heuristic for migration in an embodiment in accordance with techniques herein.

Referring to FIG. 9, shown is an example illustrating use of a prefetch heuristic that may be used in determining an ordering of data portions migrated in an embodiment in accordance with techniques herein. The example 800 illustrates a logical address space for a LUN or other logical entity denoted by 414a of FIG. 8. The logical address space in this example ranges from logical address or location 1 to 100, inclusively, as denoted by element 802. Assume that the background copying of the migration process has copied data from logical addresses 1-10 as denoted by the shaded portion 803. The application 602 may send a first read to the target data storage system 520 where the read requests data at logical address 50. Subsequently, two more consecutive reads may also be received directed to logical addresses 40 and 60. Consistent with discussion herein, the data migration engine 620a may determine that data for all three of the foregoing reads has not yet been migrated and then redirects the three reads to logical addresses 50, 40 and 60 to the source system 410 to be serviced by retrieving the data from 414a in a manner similar to that as described above. In further detail, the data for logical addresses 50, 40 and 60 may be returned from the source system to the target system. The target system may then store the data in its local target copy and return the requested data for the three reads to the requesting application 602. Additionally, the data from the 3 reads to logical addresses 50, 40 and 60 may be stored on the target system in 424a and mark the foregoing 3 logical addresses as having data that has been migrated as denoted by 804.

The data migration engine 620a may also track redirected read history or pattern to logical addresses 50, 40 and 60 whereby the prefetching heuristic may determine chunks or segments A and B (denoted by element 810 and 812) of consecutive contiguous logical addresses of the logical address space of 800 to be prefetched based on the 3 redirected reads. Based on the reads to logical addresses 50, 40 and 60, two segments of data to be prefetched or copied next by the background copying processing may be determined to include data from logical addresses 41-49, inclusively (segment A 810), and 51-59, inclusively (segment B 812). The foregoing two segments of data 810 and 812 have not yet been copied by the data migration engine 620a. In this manner, the data migration engine 620a may interrupt or change the background copying being performed in a default sequential manner to continue the migration of application data 414a from another new location based on the prefetching heuristic. In this example, the data migration engine 620a background copying may have performed copying of data from logical addresses 1-10 (803) based on a sequential ordering of such logical addresses as described above. During this time when data 803 is being copied, the above-noted 3 reads to logical addresses 50, 40 and 60 may be received where the prefetch heuristic then interrupts the sequential logical address ordered copying and continues copying data from logical addresses 41-49 and 51-59 of 414a.

Generally, as noted above, the prefetch heuristic may determine one or more portions of data to be prefetched based on spatial and temporal locality of reference principles whereby if a particular storage location is referenced at a particular time, then it is likely that nearby locations will be referenced in the near future. As applied to a LUN, for example, where there are one or more reads to particular logical addresses of the LUN, it may be determined that it is likely the subsequent future reads may reference other logical addresses that are near or in proximity to the redirected reads to logical addresses 50, 40 and 60.

The data migration engine 620a may track redirected reads as just described and may, more generally, track all reads of 603 directed to the application data 424a (e.g., where such reads include redirected reads as well as those reads that can be serviced using data already migrated to the target system without requiring redirection to the source). In this manner, the data migration engine 620a may track the read pattern directed to the application data 424a to determine what data to prefetch whereby such prefetched data is copied by the data migration engine 620a.

As another example, assume that data for logical address 1-10 (803) for the LUN have been copied as described above and a read from the application 602 is received at the target system 420 requesting data from logical address 40 and then another read is received requesting data from logical address 50. For the first read, the data migration engine 620a records the read to logical address 40 and redirects the read to the source system where the source system returns the data for logical address 40 to the target system in a manner as described above. The target system returns the data read for logical address 40 to the application 602 and also updates its local target system copy 424a of the LUN to include data for logical address 40. Upon receiving the second read for data at logical address 50, the data migration engine 620a records the read to logical address 50 and redirects the read to the source system where the source system returns the data for logical address 50 to the target system. The target system returns the data read for logical address 50 to the application 602 and also updates its local target system copy 424a of the LUN to include data for logical address 50. Additionally, the data migration engine's prefetching heuristic may determine a next segment of data to be migrated as all data from logical addresses 41-49, inclusively. Thus, the data migration engine 620a in this latter example may determine the next segment of data to be migrated as prefetched data is based on the two previous redirected reads for logical addresses 40 and 50.

Figure 10:
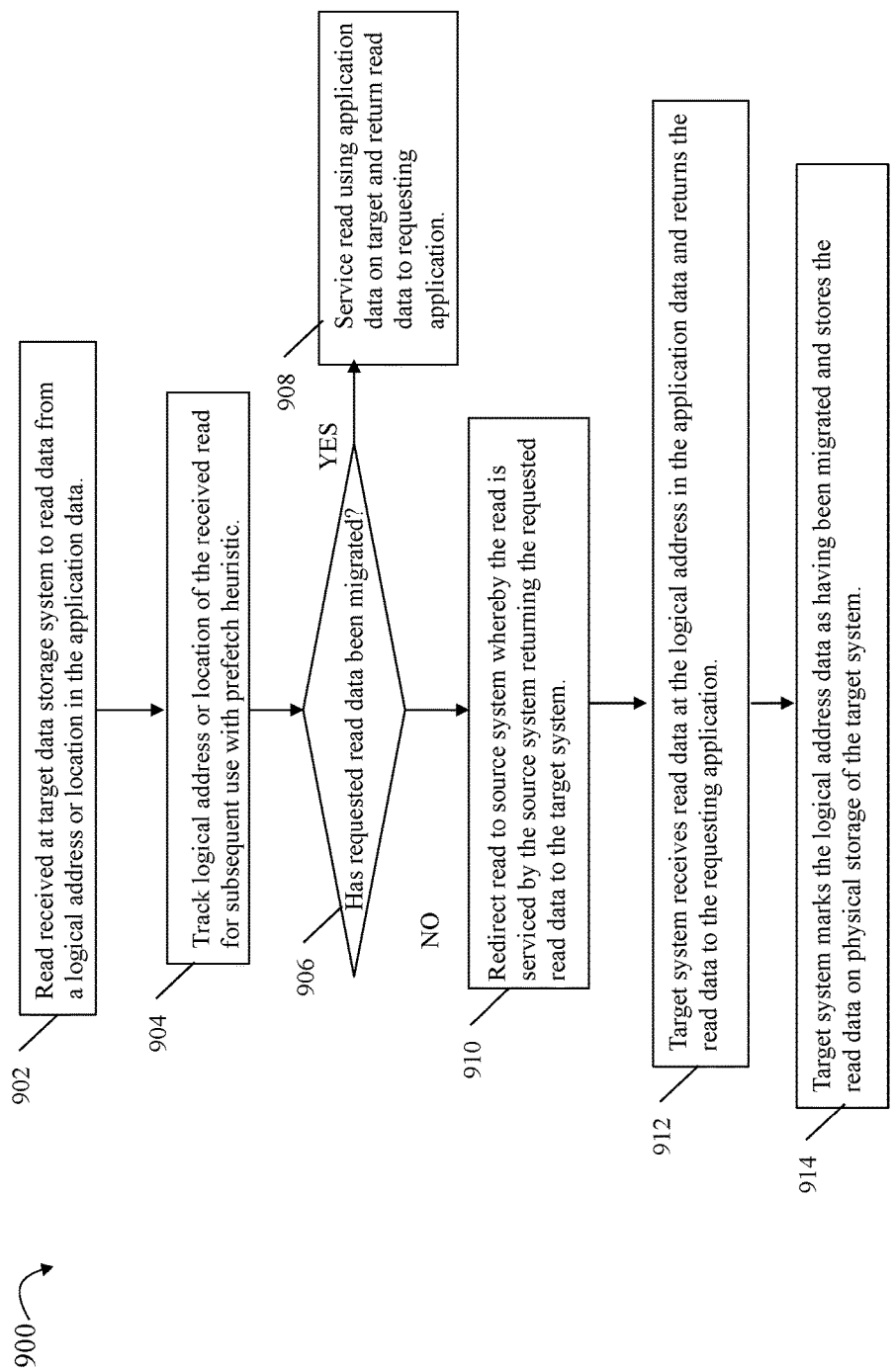
FIGS. 10, 11, 12B and 13 are flowcharts of processing steps that may be performed in an embodiment in accordance with techniques herein.

Referring to FIG. 10, shown is a first flowchart 900 of processing steps that may be performed in an embodiment in accordance with techniques herein. The flowchart 900 processing may be performed in connection with processing a read operation received from the application 602 at the target system 420 where the read is directed to the application data 424a. The flowchart 900 summarizes processing described above for processing a read operation directed to the application data currently being migrated. At step 902, a read operation may be received at the target data storage system to read data from a logical address of location of the application data 424a. At step 902, processing is performed to track the logical address or location of the received read for subsequent use with the prefetch heuristic. At step 906, a determination may be made as to whether the requested read data has been migrated from the source to the target data storage system. If step 906 evaluates to yes, control proceeds to step 908 where the read may be serviced using the application data 424a on the target data storage system and subsequently returning the read data requested to the requesting application. If step 906 evaluates to no, control proceeds to 910 where the read is redirected to the source data storage system for servicing. In step 910, the requested read data is returned by the source data storage system to the target data storage system. In step 912, the target data storage system receives the requested read data located at the logical address in the application data and returns the requested read data to the requesting application. At step 914, the target system marks the logical address data as having been migrated or copied to the target system and stores the read data on the physical storage 424 of the target system.

Consistent with description herein, an embodiment may also store the requested read data in cache of the target data storage system as part of processing performed in steps 908 and 912.

Figure 11:
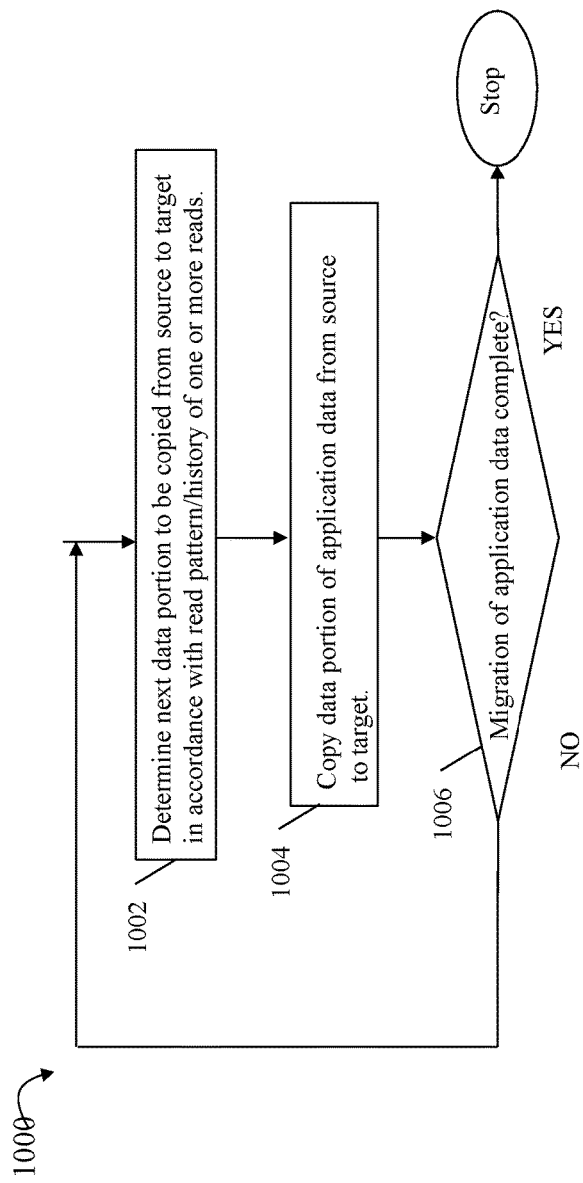

Referring to FIG. 11, shown is a second flowchart 1000 of processing steps that may be performed in an embodiment in accordance with techniques herein. The flowchart 1000 processing may be performed by a background copying process which migrates the application data from the source to the target data storage system as described above. The flowchart 1000 summarizes processing described above that may be performed by the background copying process. at step 1002, processing is performed to determine the next data portion of the application data to be copied from the source to the target data storage system in accordance with the read history or pattern of one or more reads received at the target data storage system. In one embodiment, the next data portion to be copied may be characterized as a prefetched data portion determined using a prefetch heuristic in accordance with the one or more logical addresses of the most recent one or more read requests received at the target system 420 from the application 602 where such read requests are directed to application data 424a. At step 1004, processing is performed to copy the next data portion of the application data 414a from the source to the target data storage system. At step 1006, a determination is made as to whether the migration of the application data 414a is completed. If step 1006 evaluates to yes, background copying of the application data stops. If step 1006 evaluates to no, control proceeds to step 1002 to determine the next data portion to be copied. It should be noted that if no subsequent reads are received such that there are no reads forming a recent read pattern or history to use in determining the next data portion to prefetch, an embodiment may use a default copying technique until a sufficient number of one or more reads are received to determine the next data portion using the prefetch heuristic. As an example, as described herein, a default technique for copying may be to copy data based on the increasing sequential ordering of logical addresses of the application data 414. Using the default technique, for example with reference back to FIG. 9, copying may resume with logical address 11 after copying data from segments 810 and 812 if no further reads have been received.

As described above, an embodiment in accordance with techniques herein may use a prefetch heuristic to determine an order in which different contiguous segments of the logical address space of the application data 414a are migrated. The prefetch heuristic may use a read history or pattern, such as one or more most recent reads, to determine the next subsequent segment of the application data to migrate. As such, an embodiment in accordance with techniques herein may determine the particular order in which segments of the application are copied in accordance with reads only and not writes of the received I/Os 603.

The received I/Os 603 from the application 602 may also include writes and the data migration engine 620a may perform processing that will now be described in connection with servicing such writes directed to application data 424a. Generally, as known in the art, a write to physical storage, such as a PD 424, may be performed where the size of the write is a multiple of a write granularity size, such as a number of blocks. However, a write I/O operation received from an application may be to write data having a size that is not an exact multiple of the write granularity size. For example, consider an embodiment having a write size granularity of 4K bytes where writing of data to physical storage is performed in chunks that are multiples of 4K bytes. A write I/O operation may be received which writes 512 bytes of write data. In such a case, an embodiment may perform additional processing to actually write out the 512 bytes of write data to physical storage since there is a requirement to write out data in chunks that are multiples of 4K bytes. In one embodiment, merge processing may be performed to merge the 512 bytes of write data with other existing data of a 4K byte segment to form a final merged 4K byte segment to be written to physical storage. This merge processing will now be described with reference to FIG. 12A.

Figure 12A:
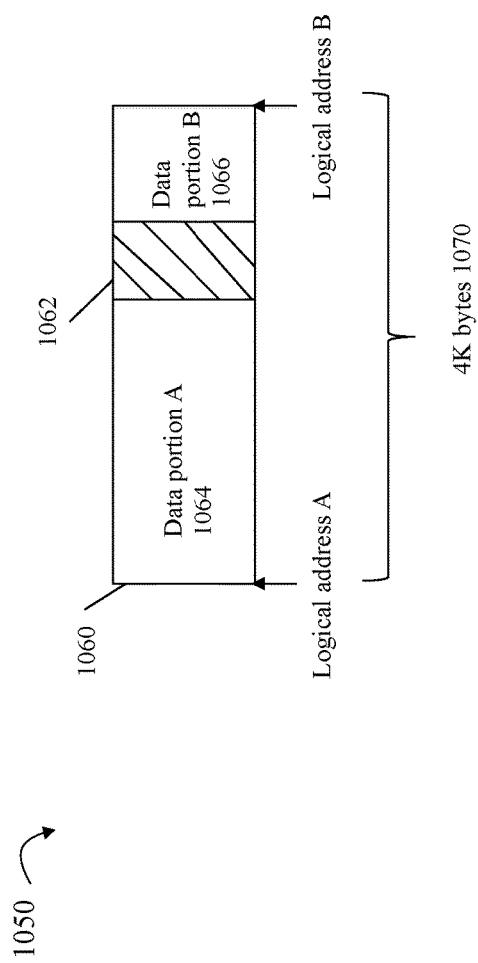
FIG. 12A is an example illustrating merge processing in connection with write data that may be performed in an embodiment in accordance with techniques herein.

With reference to FIG. 12A, element 1062 may represent the 512 bytes of write data to be written to a target logical address of the application data 424a. Element 1060 may represent a 4K byte portion of the logical address space having a starting logical address A and an ending logical address B. The target logical address of the write data 1062 may be a logical address included in the range from logical address A to logical address B. Since data written to physical storage in this example must be a multiple of 4K bytes, an embodiment may retrieve from physical storage the existing data of the 4K bytes of the address space spanning logical address A to logical address B and store such existing data in a memory or other data buffer. Merge processing may then be performed to form resulting segment 1070 whereby the write data 1062 is written to the data buffer and overwrites any existing data currently stored at the target logical address of 1062. The resulting segment 1070 may then be written out to the physical storage 424. In a similar manner, the source data storage system 410 may also require that any write to physical storage 414 have a size that is a multiple of the write size granularity of 4K.

In an embodiment in accordance with techniques herein, the data migration engine 620*a* may process a received write operation of 603 directed to application data 424*a*. Such processing may include determining whether the write operation is an operation to write data having a size that is a multiple of the write size granularity. If so, then processing may be performed to write the write data to both the source and target data storage systems (e.g., write the write data to both 414*a* and 424*a*). If the write operation is an operation to write data having a size that is not a multiple of the write size granularity, processing may be performed to redirect the write to the source data storage system whereby the source data storage system writes the write data to the application data 414*a* by performing merge processing such as described in connection with FIG. 12A above. The target data storage system marks the target location as including data that has not yet been migrated from the source to the target data storage system. Subsequently, at a later point in time, the write data stored at the target location in the source data storage system's application data 414*a* will be migrated to the target data storage system's application data 424*a* by the background copying process performed to migrate application data 414*a* to the target data storage system 420.

Figure 12B:
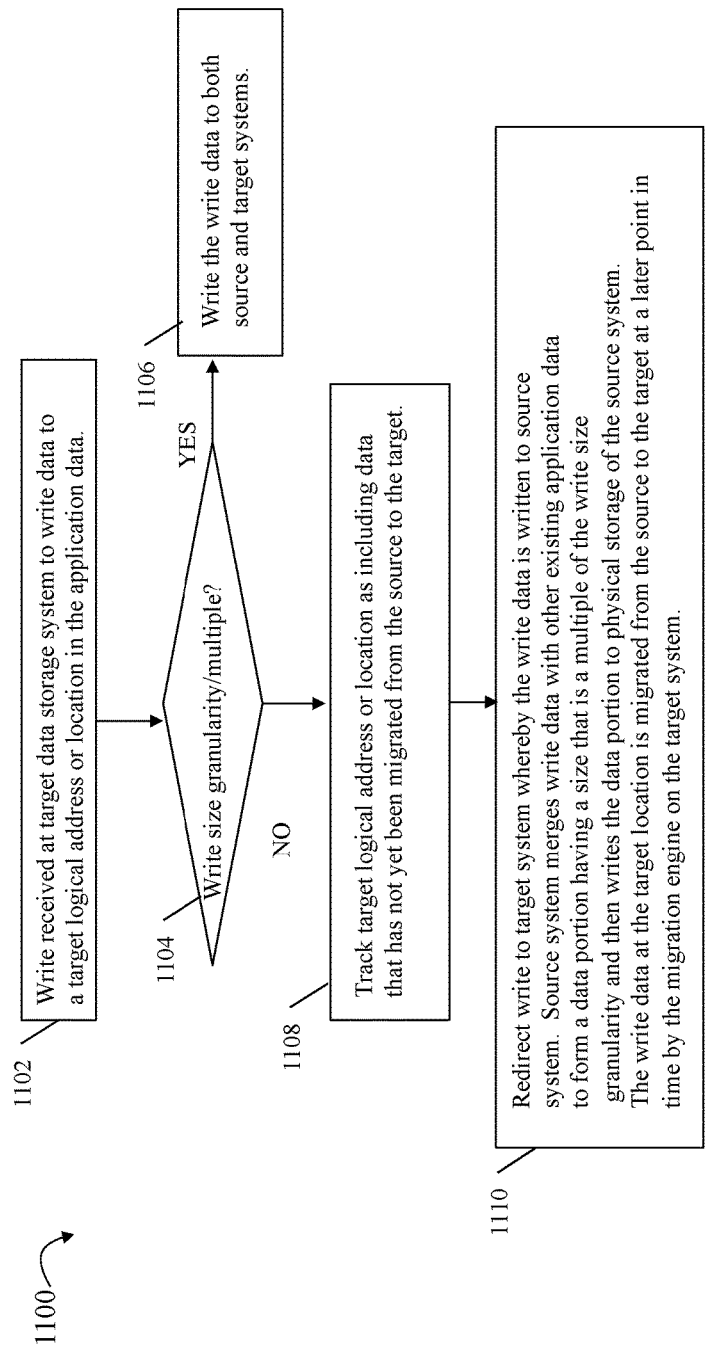

Referring to FIG. 12B, shown is a third flowchart of processing steps that may be performed in an embodiment in accordance with techniques herein. The flowchart 1100 summarizes processing described above in connection with the data migration engine 620*a* processing a write operation directed to application data 424*a* where the write may be received at the target data storage system 420 while the migration of application data 414*a* to 424*a* is in progress. At step 1102, a write is received at target data storage system to write data to a target logical address or location in the application data 424*a*. At step 1104, a determination is made as to whether the write operation writes data having a size that is a multiple of the write size granularity. If step 1104 evaluates to yes, control proceeds to step 1106 to write the write data to copies of the application data at both the source and target data storage systems. If step 1104 evaluates to no, control proceeds to step 1108 to mark the target logical address or location of the write operation as including data that has not yet been migrated from the source to the target data storage system. At step 1110, the write is redirected to the target data storage system whereby the write data is written to the copy of the application data 414*a* on the source data storage system but is currently not written to the copy of the application data 424*a* on the target data storage system. On the source data storage system, the write is processed by merging the write data with other existing application data to form a final merged data portion having a size that is a multiple of the write size granularity. As described above, the final merged data portion has a logical address range spanning from a starting to an ending logical address where the size of the range is a multiple of the write granularity size and where the target logical address is located in the range. In step 1110, the existing data located at the logical address range of the application data is first retrieved and then the write data is written over the existing data of the target logical address to now form the final merged data portion which is written out to physical storage (e.g., to PD 414) of the source data storage system. The write data of the target location is migrated from the source to the target data storage system at a later point in time by the data migration engine 620*a* of the target data storage system (e.g., the write data of the target location is later copied from 414*a* to 424*a* by the background copying performed for migrating the application data 414*a*).

An embodiment in accordance with techniques herein may also optionally include a feature that processes read I/O operations which are less than chunk size, or more generally, less than the size of the smallest unit in which data is written out to physical storage. For example, with reference back to FIG. 8, when an application read I/O is received by the data migration engine 620*a* and the requested read data at a first logical address is not currently stored on the target system 420 (e.g., read data has not been migrated to 424*a*), the application read I/O may be redirected to the source state storage system 410 to obtain the read data at the first logical address from 414*a* and return the requested read data to the target system 420. Once the target system 420 receives the read data that is less than a chunk size, or more generally the read data does not have a size that is a multiple of the write size granularity (e.g., not equal to a multiple size of the granularity of performing physical storage writes to 424), the source system may perform a variation of processing described above. The requested read data from the first logical address is returned to the host, as described above. However, in this variation, the data migration engine 620*a* rather tracks or marks that there has been a read to the first logical address and simply returns the requested read data to the application 1 602 without persisting or writing out the read data to 424*a* on the target data storage system 420. Thus, the read data stored at the first logical address still has yet to be migrated from 414*a* of the source data storage system 410 to 424*a* of the target data storage system 420. In this manner, the data of the first logical address may be migrated to 424*a* as part of data migration processing performed, for example, in connection with FIG. 11 processing by the background copying or migration process, where such migration is performed subsequent to the read operation processing just described. However, the data migration engine 620*a* may still track, as described elsewhere herein, the particular location to which the read has been directed (e.g., the first logical address) and consider such a location in the read pattern used by the prefetch heuristic to determine a particular order in which data stored at various logical addresses of 414*a* is copied or migrated to 424*a*. In such an embodiment, the data migration engine 620*a* may track 2 sets of information for a particular logical address of application 1 data 414*a*—a first bit indicating whether the data of the logical address has been migrated and a second bit indicating whether there has been a read to the logical address where such information regarding the second bit may be used in connection with the prefetch heuristic to determine what data is migrated next from 414*a* to 424*a*.

Figure 13:
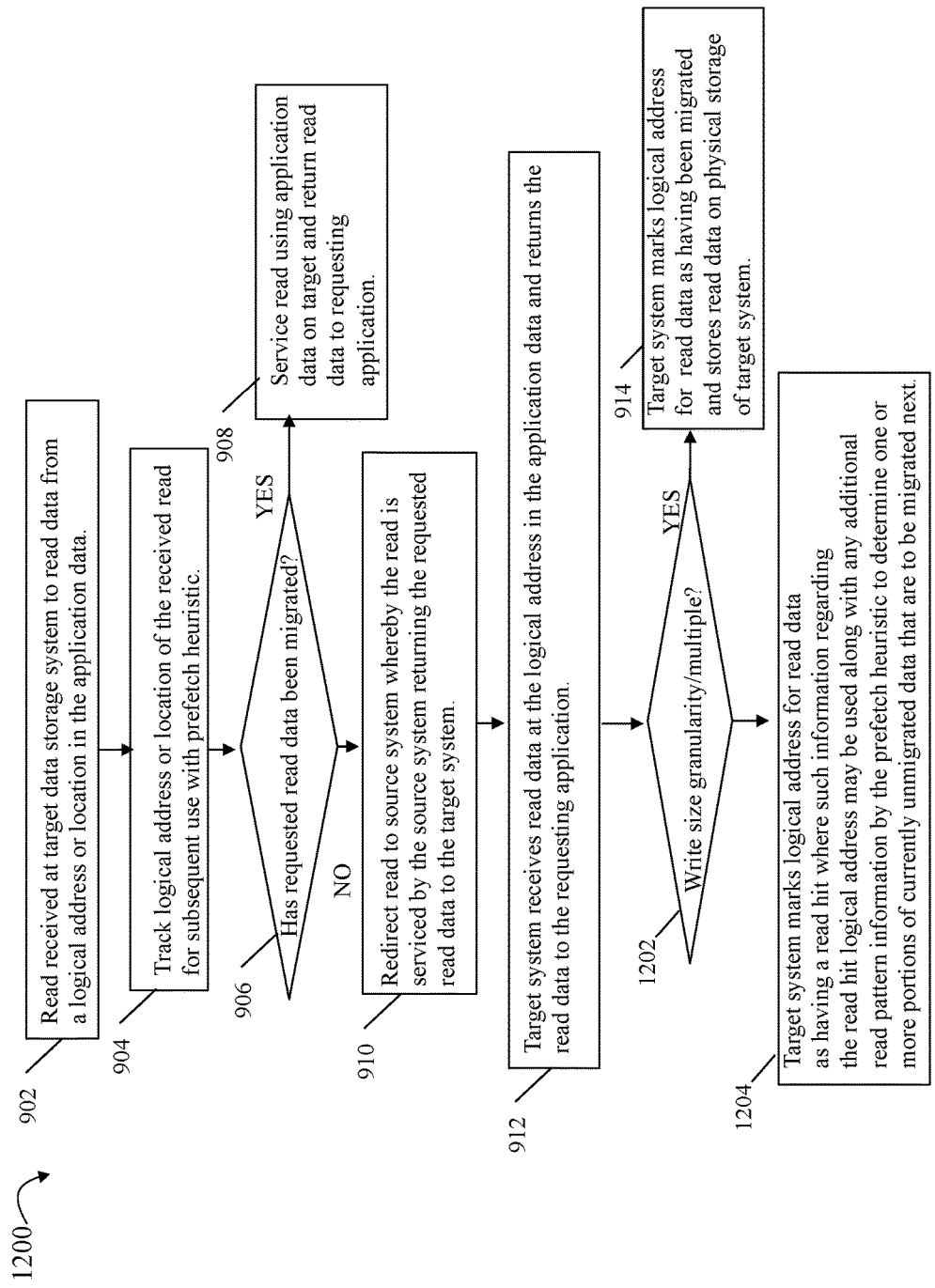

Referring to FIG. 13, shown is another flowchart of processing steps that may be performed in an embodiment in connection with techniques herein. The flowchart 1200 may be generally characterized as the variation of read I/O processing described above. The flowchart 1200 may be performed as a variation or alternative to processing of a read I/O as described in connection with the flowchart 900 of FIG. 10. In the flowchart 1200 of FIG. 13, processing steps 902, 904, 906, 908, 910, 912, and 914 may be performed as described above in connection with FIG. 10 with the difference or addition in FIG. 13 of steps 1202 and 1204. From step 912, processing continues with step 1202 where a determination is made as to whether the size of the read data is equal to a multiple of the write size granularity of writing data out to physical storage on the target system. If step 1202 evaluates to yes, control proceeds to step 914 where the target system marks the logical address for the read data as having been migrated and stores the read data on physical storage of the target system. It should be noted that in connection with step 914 (both of FIG. 13 and FIG. 10), the read data may be first stored to cache and then destaged or written out to physical storage on the target system at a later point in time. In connection with writing out the read data to physical storage, an embodiment may perform processing in manner similar to as described herein with merge processing for write data whereby the read data may be merged with other existing data to form a final data portion having a size that equals the write size granularity, or is a multiple thereof. The final data portion is then written out to physical storage.

If step 1202 evaluates to no, control proceeds to step 1204. At step 1204 the target system marks the logical address for read data as having a read hit where such information regarding the read hit to the logical address may be used along with any additional read pattern information by the prefetch heuristic to determine one or more portions of currently unmigrated application data that are to be migrated next, such as by the background copying or migration processing performed in connection with FIG. 11 processing as described herein. In connection with step 1204, the read data is not persisted or stored on physical storage of the target system.

It should also be noted that an embodiment in accordance with techniques herein may also use the collected information about the particular logical locations of the application 1 data to which reads and also writes have been directed during the migration of the application 1 data 414*a* to 424*a* to further populate the cache of the target system 420.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing migration from a source node to a target node comprising:
    migrating, from the source node to the target node, application data used by an application, wherein I/O operations from the application directed to the application data are sent to the target node; and
    while performing said migrating of the application data, performing first processing on the target node in connection with I/O operations directed to the application data, said first processing comprising:
        monitoring one or more read operations that are directed to the application data and received at the target node; and wherein said migrating includes:
        selecting a first data portion of the application data to be copied from the source node to the target node, wherein said selecting of the first data portion is performed subsequent to receiving the one or more read operations at the target node, wherein the first data portion has a first logical location in the application data, wherein data stored at the first logical location is not requested for reading by the one or more read operations and the first logical location is determined in accordance with one or more logical locations of requested read data specified by the one or more read operations that are sent from the application and received at the target node prior to selecting the first data portion, wherein the one or more read operations received at the target node prior to selecting the first data portion includes at least a first redirected read operation that is forwarded to the source node for servicing since the first redirected read operation requests read data not yet migrated to the target node; and
    copying the first data portion of the application data from the source node to the target node, wherein the first data portion, selected in accordance with the one or more read operations that are directed to the application data, sent from the application and are received at the target node, is prefetched and copied from a source copy of the application data stored on non-volatile storage on the source node to the target node prior to the target node receiving a read requesting data of the first data portion.

2. The method of claim 1, wherein the application has been migrated from the source node to the target node and, while performing said migrating of the application data, the application is executing on the target node and an instance of the application is no longer executing on the source node.

3. The method of claim 1, wherein the application data is not exposed to the application through the source node.

4. The method of claim 3, wherein, at a first point in time prior to said migrating copying the first data portion, said migrating is copying a second data portion from a second logical location in the application data, wherein the first logical location and the second logical location are not sequential consecutive logical locations in the application data.

5. The method of claim 4, wherein, at the first point in time, said migrating is copying the second data portion of the application data based on increasing linear sequential ordering of the logical address space of the application data, and subsequent to the first point in time, said migrating copies the first data portion having the first logical location.

6. The method of claim 1, wherein a migration engine is on the target node controlling said migrating by pulling the application data from the source node to the target node, and wherein the migration engine tracks which portions of the application data have been migrated from the source node to the target node.

7. The method of claim 6, wherein the migration engine performs I/O routing for I/Os directed to the application data comprising:
    receiving a first read that is from the application and is directed to the application data;
    determining whether first read data requested by the first read has been migrated to the target node; and
    if it is determined that the first read data has not yet been migrated to the target node, redirecting the first read to the source node for servicing.

8. The method of claim 7, wherein servicing the first read comprises:
    sending the first read from the target node to the source node;
    retrieving, at the source node, the first read data requested by the first read;
    sending the first read data from the source node to the target node; and
    returning, by the target node, the first read data to the application.

9. The method of claim 8, further comprising:
storing, on the target node, the first read data on non-volatile storage including the application data that has been migrated from the source node to the target node; and
tracking, by the migration engine, that first read data having an associated logical location in the application data has been migrated from the source node to the target node.

10. The method of claim 8, further comprising:
determining whether the first read data has a size that is a multiple of a write size granularity denoting a size unit in which data is written to physical storage;
responsive to determining the first read data does have a size that is a multiple of the write size granularity, performing other processing including:
storing, on the target node, the first read data on non-volatile storage including the application data that has been migrated from the source node to the target node; and
tracking, by the migration engine, that first read data having an associated logical location in the application data has been migrated from the source node to the target node.

11. The method of claim 10, further comprising:
responsive to determining the first read data does not have a size that is a multiple of the write size granularity, performing second processing comprising:
tracking an associated logical location of the first read data as a location including data that has not been migrated from the source node to the target node, wherein the associated logical location is tracked as having been a target of a read operation that is included in the one or more read operations of said monitoring for use in connection with determining a next data portion to prefetch from the source node, and wherein the first read data is not stored on non-volatile storage including the application data that has been migrated from the source node to the target node.

12. The method of claim 1, wherein the migration engine performs said migrating as a background copying operation.

13. The method of claim 1, wherein the migration engine performs said monitoring of the one or more read operations, and the migration engine uses a prefetch heuristic to determine the first logical location in accordance with the one or more read operations.

14. The method of claim 13, wherein the one or more read operations includes two read operations received at the target node, a first of the two read operations being directed to a first logical address of the application data and a second of the two read operations being directed to a second logical address of the application data, said prefetch heuristic determining the first data portion that is a logically contiguous segment of the application data to be copied by said migrating, the logically contiguous segment spanning a logical address subrange of the application data from the first logical address to the second logical address.

15. The method of claim 1, wherein the application data is a logical entity that is any of a logical storage device, a file, and an object.

16. The method of claim 1, the first processing further comprising:
receiving a write operation directed to the application data, the write operation writing data to a target location of the application data;
determining whether the write operation writes data having a size that is a multiple of a write size granularity; and
responsive to determining the write operation writes data having a size that is a multiple of the write size granularity, performing the write operation on a copy of the application data of the target node and performing the write operation on another copy of the application data of the source node.

17. The method of claim 16, the first processing further comprising:
responsive to determining the write operation does not write data having a size that is a multiple of the write size granularity, performing second processing comprising:
tracking the target location as a location including data that has not been migrated from the source node to the target node; and
redirecting the write operation to the source node for servicing by the source node, wherein the source node performs merge processing that generates a final data portion having a size that is a multiple of the write size granularity, said merge processing merging first write data of the write operation at the target location with other existing data to form the final data portion stored on the source node, wherein said migrating copies the first write data of the target location from the source node to the target node at a point in time subsequent to storing the final data portion on the source node.

18. The method of claim 1, wherein the source node and the target node are both data storage systems.

19. A non-transitory computer readable medium comprising code stored thereon that, when executed, performs a method of migration from a source node to a target node comprising:
migrating, from the source node to the target node, application data used by an application, wherein I/O operations from the application directed to the application data are sent to the target node; and
while performing said migrating of the application data, performing first processing on the target node in connection with I/O operations directed to the application data, said first processing comprising:
monitoring one or more read operations that are directed to the application data and received at the target node; and wherein said migrating includes:
selecting a first data portion of the application data to be copied from the source node to the target node, wherein said selecting of the first data portion is performed subsequent to receiving the one or more read operations at the target node, wherein the first data portion has a first logical location in the application data, wherein data stored at the first logical location is not requested for reading by the one or more read operations and the first logical location is determined in accordance with one or more logical locations of requested read data specified by the one or more read operations that are sent from the application and received at the target node prior to selecting the first data portion, wherein the one or more read operations received at the target node prior to selecting the first data portion includes at least a first redirected read operation that is forwarded to the source node for servicing since the first redirected read operation requests read data not yet migrated to the target node; and copying the first data portion of the application data from the source node to the target node, wherein the first data portion, selected in accordance with the one or more read operations that are directed to the application data, sent from the application and are received at the target node, is prefetched and copied from a source copy of the application data stored on non-volatile storage on the source node to the target node prior to the target node receiving a read requesting data of the first data portion.

20. A system comprising:

a source data storage system including application data that is stored on a non-volatile storage device and that is used by an application; and a target data storage system comprising an instance of the application stored in a second memory, said second memory further comprising code stored therein that, when executed, performs a method of migration from the source data storage system to the target data storage system comprising:

migrating, from the source data storage system to the target data storage system, the application data, wherein I/O operations from the instance of the application executing on the target data storage system are directed to the application data stored on the target data storage system; and while performing said migrating of the application data, performing first processing on the target data storage system in connection with I/O operations that are directed to the application data and are received from the application executing on the target data storage system, said first processing comprising:

monitoring one or more read operations that are received from the application executing on the target data storage system and are directed to the application data; and wherein said migrating includes:

selecting a first data portion of the application data to be copied from the source node to the target node, wherein said selecting of the first data portion is performed subsequent to receiving the one or more read operations at the target node, wherein the first data portion has a first logical location in the application data, wherein data stored at the first logical location is not requested for reading by the one or more read operations and the first logical location is determined in accordance with one or more logical locations of requested read data specified by the one or more read operations that are sent from the application and received at the target node prior to selecting the first data portion, wherein the one or more read operations received at the target node prior to selecting the first data portion includes at least a first redirected read operation that is forwarded to the source node for servicing since the first redirected read operation requests read data not yet migrated to the target node; and copying the first data portion of the application data from the source data storage system to the target data storage system, wherein the first data portion, selected in accordance with the one or more read operations that are directed to the application data, sent from the application and are received at the target data storage system, is prefetched and copied from a source copy of the application data stored on the non-volatile storage device of the source data storage system to the target data storage system prior to the target data storage system receiving a read requesting data of the first data portion, and wherein the application has been migrated from the source data storage system to the target data storage system and, while performing said migrating of the application data, the instance of the application is executing on the target data storage system and no instance of the application is executing on the source data storage system.

* * * * *